(12) United States Patent
Chen et al.

(10) Patent No.: US 11,873,569 B2
(45) Date of Patent: Jan. 16, 2024

(54) COATING FOR INTERNAL SURFACES OF AN AIRFOIL AND METHOD OF MANUFACTURE THEREOF

(71) Applicant: RTX CORPORATION, Farmington, CT (US)

(72) Inventors: Lei Chen, South Windsor, CT (US); Lesia V. Protsailo, Bolton, CT (US); Michael N. Task, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 640 days.

(21) Appl. No.: 16/927,417

(22) Filed: Jul. 13, 2020

(65) Prior Publication Data

US 2020/0347506 A1 Nov. 5, 2020

Related U.S. Application Data

(62) Division of application No. 15/605,720, filed on May 25, 2017, now Pat. No. 10,711,361.

(51) Int. Cl.
*C25D 5/12* (2006.01)
*F01D 5/18* (2006.01)
(Continued)

(52) U.S. Cl.
CPC ............. *C25D 5/12* (2013.01); *B32B 15/04* (2013.01); *C22C 27/06* (2013.01); *C23C 18/165* (2013.01); *C23C 18/1616* (2013.01); *C23C 18/1692* (2013.01); *C23C 18/32* (2013.01); *C23C 18/50* (2013.01); *C25D 3/56* (2013.01); *C25D 5/50* (2013.01); *C25D 7/008* (2013.01); *F01D 5/187* (2013.01); *B32B 2603/00* (2013.01); *F01D 5/288* (2013.01); *F05D 2230/90* (2013.01); *F05D 2300/121* (2013.01); *F05D 2300/132* (2013.01);
(Continued)

(58) Field of Classification Search
None
See application file for complete search history.

(56) References Cited

U.S. PATENT DOCUMENTS 4,332,843 A 6/1982 Ahuja
6,153,313 A 11/2000 Rigney et al.
(Continued)

FOREIGN PATENT DOCUMENTS

EP 0170429 A1 2/1986
EP 0879900 B1 12/2003
(Continued)

OTHER PUBLICATIONS

Extended European Search Report for EP Application No. 18173831.1; Report dated Oct. 15, 2018 (11 pages).

*Primary Examiner* — Seth Dumbris
(74) *Attorney, Agent, or Firm* — CANTOR COLBURN LLP

(57) ABSTRACT

Disclosed herein is a method of coating, comprising providing an article having an internal passage therein to be coated; electrolytically applying a first layer that comprises chromium or a chromium alloy onto a surface of the internal passage; electrolytically applying a second layer comprising aluminum or an aluminum alloy onto the first layer; and heat treating the article to promote interdiffusion between the first layer and the second layer.

15 Claims, 4 Drawing Sheets

(51) Int. Cl.
*C25D 7/00* (2006.01)
*C25D 5/50* (2006.01)
*C23C 18/50* (2006.01)
*C23C 18/16* (2006.01)
*C23C 18/32* (2006.01)
*B32B 15/04* (2006.01)
*C22C 27/06* (2006.01)
*C25D 3/56* (2006.01)
*F01D 5/28* (2006.01)

(52) U.S. Cl.
CPC .. *F05D 2300/21* (2013.01); *F05D 2300/2112* (2013.01); *F05D 2300/611* (2013.01); *F05D 2300/701* (2013.01)

(56) References Cited

U.S. PATENT DOCUMENTS

| | | |
|---|---|---|
| 6,616,969 B2 | 9/2003 | Pfaendtner et al. |
| 6,905,730 B2 | 6/2005 | Ackerman et al. |
| 6,998,151 B2 | 2/2006 | Grylls et al. |
| 7,056,555 B2 | 6/2006 | Bauer et al. |
| 7,700,154 B2 | 4/2010 | Olson |
| 8,025,730 B2 | 9/2011 | Livings et al. |
| 8,349,402 B2 | 1/2013 | Jek et al. |
| 2001/0018319 A1 | 8/2001 | Czech |
| 2009/0185912 A1* | 7/2009 | Walker ................. C23C 28/322 428/210 |
| 2010/0047592 A1* | 2/2010 | Jabado ..................... C23F 1/00 205/333 |
| 2010/0072073 A1 | 3/2010 | Jabado et al. |
| 2013/0341197 A1 | 12/2013 | Piascik et al. |
| 2014/0321997 A1 | 10/2014 | Kirkendall et al. |
| 2016/0312614 A1* | 10/2016 | Chen ..................... C25D 3/665 |

FOREIGN PATENT DOCUMENTS

| | | |
|---|---|---|
| EP | 2886684 A1 | 6/2015 |
| GB | 2181744 A | 4/1987 |

* cited by examiner

COATING FOR INTERNAL SURFACES OF AN AIRFOIL AND METHOD OF MANUFACTURE THEREOF

CROSS-REFERENCE TO RELATED APPLICATIONS

This application is a Division of U.S. patent application Ser. No. 15/605,720 filed May 25, 2017, the contents of which are incorporated by reference herein in their entirety.

BACKGROUND

The present disclosure relates to a method of coating an internal surface of a component to enhance hot corrosion resistance. In particular, the present disclosure relates to a method of coating the internal surface of an airfoil to enhance hot corrosion resistance.

During operation of gas turbine engines, the temperatures of combustion gases may exceed 3,000° F., which is considerably higher than the melting temperatures of the metal parts of the engine, which are in contact with these gases. The metal parts that are particularly subject to temperature extremes and degradation by the oxidizing and corrosive environment, and thus require particular attention with respect to cooling, are the hot section components exposed to the combustion gases, such as blades and vanes used to direct the flow of the hot gases, as well as other components such as shrouds and combustors.

High and low pressure turbine airfoils are manufactured from nickel based super alloys. These components are protected against the high temperature environment by a thermal barrier coating (TBC). However, the internal surface of airfoil can be difficult to coat, therefore often susceptible to high temperature oxidation and material damage and loss in more corrosive environment.

Internal surface oxidation has been found to be responsible for airfoil performance deterioration due to blockage of the air passages in the trailing edge. This issue is particularly pronounced in countries where air pollution leads to high $SO_2$ concentration and airborne particulate matters contains sulfate and phosphate in the atmosphere. Repairing the airfoil with internal oxidation damages involves rebuilding the wall and replenishment of elements that can form thermally grown oxides for protection. Traditional coating application techniques such as plasma spray, cathodic arc, electron beam physical vapor etc., are not suitable for coating the internal surface due to line of sight limitation.

SUMMARY

Disclosed herein is a method of coating, comprising providing an article having an internal passage therein to be coated; electrolytically applying a first layer that comprises chromium or a chromium alloy onto a surface of the internal passage; electrolytically applying a second layer comprising aluminum or an aluminum alloy onto the first layer; and heat treating the article to promote interdiffusion between the first layer and the second layer.

In an embodiment, the electrolytically applying of the first layer and/or the electrolytically applying of the second layer is conducted via electrodeposition.

In another embodiment, the electrodeposition is conducted via electroless deposition.

In yet another embodiment, the electrodeposition is conducted by using conforming electrodes that traverse internal passages of the component without contacting a surface of the article.

In yet another embodiment, the conforming electrode is an anode and where the article is a cathode.

In yet another embodiment, the conforming electrode is coated with a porous electrically insulating material.

In yet another embodiment, the electrolytically applying of the first layer comprises using an electrolyte that comprises a suspension of chromium or nickel-chromium.

In yet another embodiment, the electrolytically applying of the second layer comprises using an electrolyte that comprises a suspension of aluminum or an aluminum alloy.

In yet another embodiment, the first layer has a thickness of 50 to 100 micrometers.

In yet another embodiment, the second layer has a thickness of 25 to 75 micrometers.

In yet another embodiment, the heat treating is conducted at a temperature of 800 to 1600° C.

In yet another embodiment, the heat treating results in the formation of a layer of thermally grown oxides that comprise alumina and chromium oxide that is disposed on a layer of Ni—Cr/aluminide or a layer of Cr/aluminide.

In yet another embodiment, the Ni—Cr/aluminide layer or the Cr/aluminide layer contains aluminum and chromium that vary in amount inversely with one another with distance from a surface of the article or from a surface of the thermally grown oxide layer.

In an embodiment, the article is an airfoil.

Disclosed herein too is an airfoil comprising an internal surface having disposed thereon a thermally grown oxide layer that comprises alumina and chromium oxide; and a layer comprising Ni—Cr/aluminide or Cr/aluminide disposed between the layer comprising alumina and chromium oxide and the internal surface of the airfoil.

In yet another embodiment, the layer comprising Ni—Cr/aluminide or Cr/aluminide contains aluminum and chromium that vary in amount inversely with one another with distance from the internal surface of the airfoil or from a surface of the thermally grown oxide layer.

In yet another embodiment, the thermally grown oxide layer has a thickness of 2 to 7 micrometers.

In yet another embodiment, the layer comprising Ni—Cr/aluminide or Cr/aluminide has a thickness of 50 to 100 micrometers.

In yet another embodiment, the layer comprising Ni—Cr/aluminide or Cr/aluminide is obtained by thermally treating a first layer comprising chromium or nickel-chromium that is disposed on the internal surface of the airfoil; and a second layer that contains aluminum or an aluminum alloy that is disposed on the first layer.

In yet another embodiment, the first layer and the second layer are deposited electrolytically.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
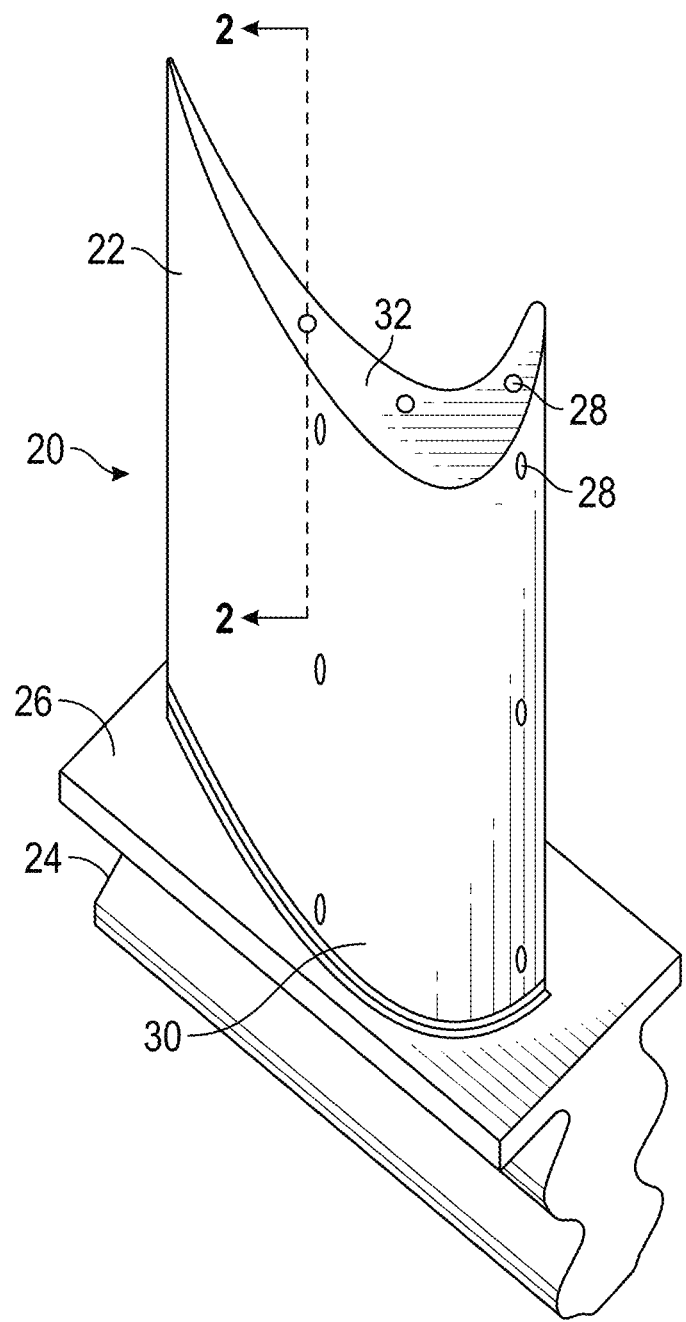
FIG. 1 is a schematic view of a component illustrated as a turbine blade.

Disclosed herein is a protective coating for the internal surface of an airfoil that enhances hot corrosion resistance. The protective coating comprises multiple elements that can form an oxidation protection structure and compositions during coating preparation as well as subsequent high temperature operation. A multilayered composite precursor coating is treated to homogenize at least part of the resulting coating that comprises a metal oxide layer disposed on a chromium aluminide layer or a nickel-chromium aluminide layer that contacts the internal surface of the airfoil.

Disclosed herein too is a method for coating the internal surface of an engine airfoil. This method entails disposing a first layer comprising a metallic nickel-chromium alloy (hereinafter "Ni—Cr alloy") or chromium metal on an internal surface of the airfoil, followed by a second layer that comprises aluminum metal or a metallic aluminum alloy (hereinafter Al or Al alloys). The first layer contacts the internal surfaces of the airfoil while the second layer is disposed on and contacts the first layer. In an embodiment, both the first and the second layer are electrolytically deposited. In an exemplary embodiment, the first layer comprising Ni—Cr and/or Cr and the second layer comprising Al and/or the Al alloy are applied by electrodeposition, electroless deposition, or a combination that comprises both electrodeposition and electroless deposition.

When electrodeposition is deployed, conforming electrodes (preferably conforming anodes) that can conform to the convoluted passages of the airfoil are used to facilitate coating the inner surface of the airfoil. The use of conforming electrodes facilitates coating those inner surfaces of the airfoil which would otherwise be difficult to reach. The proximity of the conforming electrodes to the inner surfaces of the airfoil provides adequate throwing power to achieve effective coverage of the inner surfaces with the coating.

Following the deposition of the first and the second layers, the inner surface of the airfoil is subjected to heat treatment at an elevated temperature that produces purification and densification of the respective coating layers in addition to homogenizing the compositions in the two distinct layers. Reactions at high temperature allows reactive element aluminum to interact with any impurities such as oxides and chlorides incorporated during preceding depositions and results in removing these impurities from the bulk coating or immobilizing them to improve the high temperature resistance performance. The elevated temperature treatment produces a reaction between the chromium and aluminum to produce an aluminide diffusion layer. This diffusion layer (also termed a composite layer) restores and enhances high temperature hot resistance of the inner surface of the airfoil. Both chromium and aluminum readily form thermally grown oxides when subjected to elevated temperatures, which are known to be protective under high temperature. The aluminide layer further provides an aluminum reservoir, which retards the outward diffusion of substrate elements during service, thus increasing life cycles of the airfoil and reducing maintenance and repair.

FIG. 1 depicts a component article of a gas turbine engine such as a turbine blade or a turbine vane, and in this illustration is represented as a blade 20. The blade 20 is formed of any operable material, such as, for example, a nickel-base superalloy substrate. The blade 20 includes an airfoil 22 against which the flow of hot exhaust gas is directed.

The blade 20 is mounted to a turbine disk (not shown) by a dovetail 24 that extends downwardly from the airfoil 22 and engages a slot on the turbine disk. A platform 26 extends laterally outwardly from the area where the airfoil 22 is joined to the dovetail 24. The airfoil 22 may be described as having a root end 30 adjacent to the dovetail 24, and an oppositely disposed tip end 32 from the dovetail 24. A number of internal passages extend through the interior of the airfoil.

Figure 2:
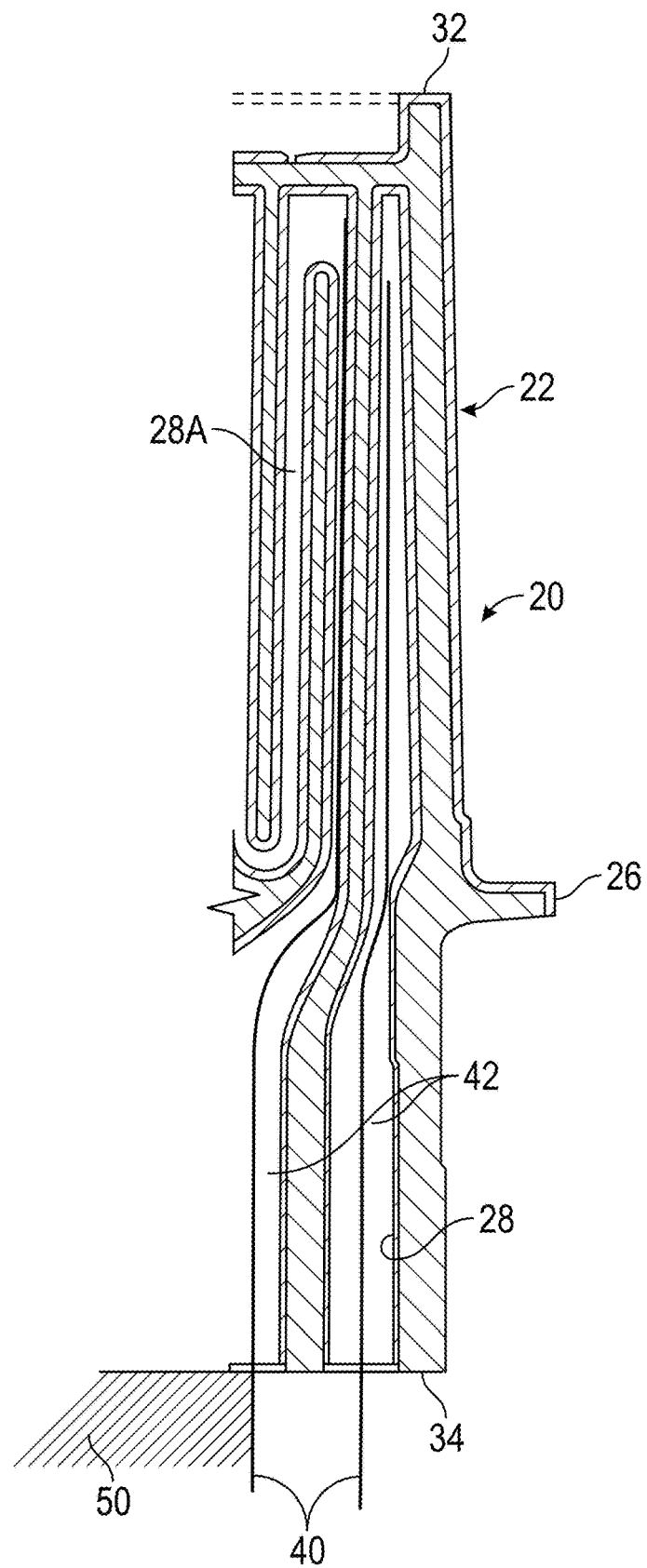
FIG. 2 is an enlarged schematic cross-section of the internal surfaces of the turbine blade of FIG. 1.

An exemplary depiction of the internal passages that lie in the interior of the airfoil is depicted in the FIG. 2. The FIG. 2 depicts an exemplary embodiment, where conforming electrodes are placed in the internal passages of the airfoil to facilitate electrodeposition of the first and the second layer. The electrodeposition will be detailed later. As may be seen in FIG. 2, a number of internal passages 28 extend through the interior of the airfoil 22. As can be seen, these passages are convoluted in shape as a result of which they are difficult to access. During service, a flow of cooling air is directed through the internal passages 28, usually from the root end 30 toward the tip end 32, to reduce the operational temperature of the airfoil 22.

Figure 3:
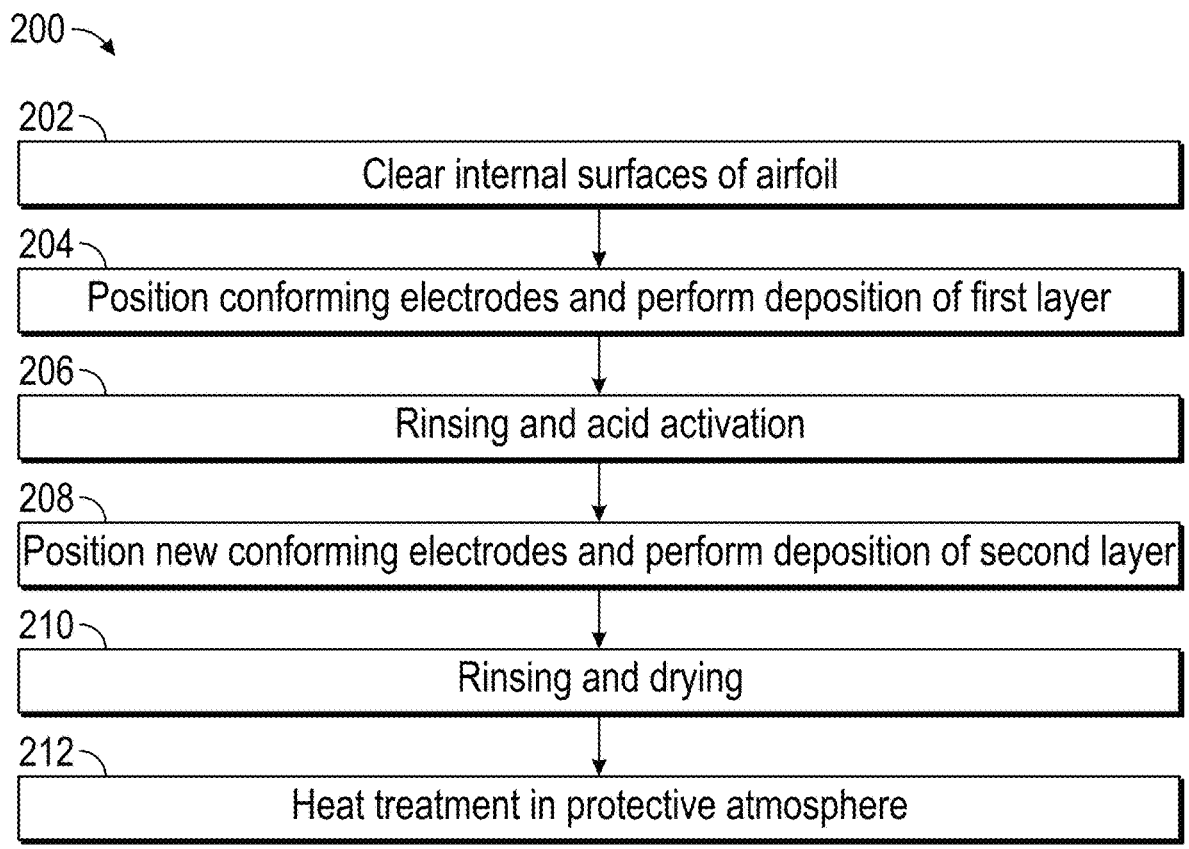
FIG. 3 is a flow chart of a method for producing the protective coating on an internal surface of the turbine blade.
Figure 4:
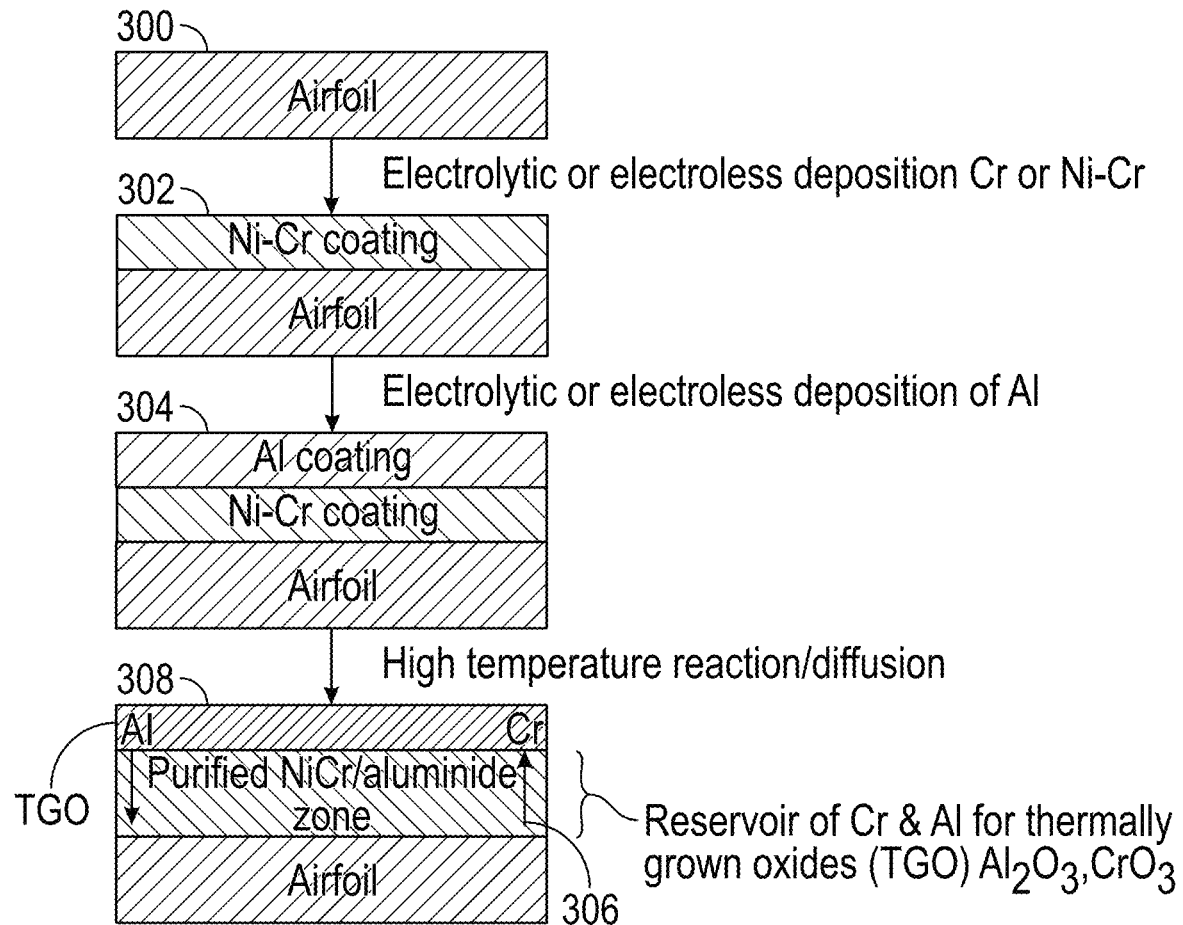
FIG. 4 is an exemplary schematic cross-sectional view of the method of coating the internal surface.

With reference to FIGS. 2, 3 and 4, one exemplary non-limiting embodiment of a method 200 for coating the internal passages 28 is disclosed. As noted above, FIG. 2 depicts the conformal anodes that traverse the convoluted internal passages of the airfoil. The blade 20, which has a coating to be applied within the internal passages 28, and which serves as a cathode in the coating application method, receives a conforming wire anode 40 (FIG. 2) for coverage of the internal passages 28 during electrodeposition or electroless deposition. The FIG. 3 depicts a general method for coating the internal passages of the airfoil while FIG. 4 depicts an exemplary schematic diagram for disposing the first and second layers on the internal surfaces and the formation of the diffusion layer after heat treatment.

With reference now to FIGS. 3 and 4, a method 200 for depositing the first layer and the second layer comprises first cleaning the internal surface 300 (see FIG. 4) by degreasing it and cleaning it with an acid. This is shown in step 202 of FIG. 3. The cleaning removes impurities such as sulfates, oxides, nitrates, and the like. This cleaning is also termed a pre-treatment step. In an embodiment, the pretreatment step may include degreasing, rinsing, acid cleaning and a final rinse.

The nickel-chromium or chromium layer (the first layer 302 in FIG. 4) is then disposed on the internal surface of the airfoil by electro-deposition (using conforming electrodes) or by electroless deposition. (See step 204 in FIG. 3) While step 204 discusses the use of conforming electrodes, this method is used only for electro-deposition. No electrodes are used for electroless deposition. The first layer 302 comprises chromium or nickel-chromium and has a thickness of 5 to 200 micrometers, preferably 50 to 100 micrometers after the deposition.

When electro-deposition is used, the conforming electrodes are shaped to conform approximately to the shapes of internal passages of the airfoil. The conforming electrode is preferably an anode and conforms to the passages whilst not contacting the airfoil internal surface.

The electroplating solution comprises chromium compounds, preferably environmentally benign trivalent chromium species and nickel compounds. Traces of other metals that may be present in the electrolyte include one or more of Zr, Hf, Ti, Ta, Si, Ca, Fe, Y and Ga.

When nickel and chromium are used in the first layer, the weight ratio of nickel to chromium is from 5:95 to 95:5, preferably 10:90 to 90:10, and more preferably 20:80 to 80:20.

Following the formation of the first layer, the coated internal surface may be optionally rinsed to remove traces of undesirable surface impurities. It may be then subjected to optional acid activation.

The primary difference between electrodeposition and electroless deposition is how the Ni, Cr, or Ni—Cr alloy are deposited. Electroless deposition relies on catalyzed reaction occurring on the surface of a substrate to reduce metal ions to metallic deposits. Oxidation of the reducing agent and the reduction of metal ions occurs at the same site on the substrate during electroless deposition, whereas reduction of metal ions (cathodic reaction) and oxidation of other substances (anodic reaction) take place on the cathode and anode, respectively. The electrodeposition is driven by an external current. Because electroless deposition does not reply upon current flow through an anode and a cathode, electroless deposition can proceed on the entire surface regardless of geometrical constraints. Electroless deposition is a truly non-line-of-sight deposition if the surface is pre-treated uniformly.

During electro-deposition with the conforming electrodes, both the blade and the conforming anode (e.g., wire or ribbon) are located in an electrolyte (not shown). The plating solution includes an electrolyte containing the ionic species of the coating composition to be deposited. The electrical field formed between the blade and the conforming wire anode permits the coating material dissolved in the electrolyte to be deposited onto the surface of the internal passages.

The conforming wire anode is insulated from direct contact with the internal passages by a porous sheath 42 (See FIG. 2). In other words, the conforming wire anode 40 is shaped to extend into the internal passages 28 but insulated from direct contact by the porous sheath 42. The close proximity of the conforming wire anode 40 to the internal passages 28 assures that the variation associated with the plating electrolyte resistance is relatively small which results in uniform current distribution. The conforming wire anode 40 extends into the internal passages 28 to improve the throwing power of the plating electrolyte. The article may be held in a fixture 50 at its base 34 during the electrodeposition.

The porous sheath generally comprises a non-electrically conducting porous polymer such as a polyolefin, polyvinyl acetate, polyvinyl chloride, polyimide, polysiloxane, polystyrene, polymethylmethacrylate, or a combination thereof.

Throwing power of the plating electrolyte can be specifically engineered by, for example, an increase to the charge transfer resistance associated with metal deposition with an increased conductivity of the plating electrolyte. This, in turn, increases coverage of the substrate to be plated by the Ni—Cr coating or Cr coating 302 (see FIG. 4). By increasing the throwing power, internal passages 28A (see FIG. 2), which do not even contain the conforming wire anode 40, can be coated. The thickness of the first layer can range from 50 to 100 micrometers before heat treatment and the partially homogenized composite coating with a diffusion zone can range from 50 to 150 micrometers.

Following the formation of the first layer, the coated surface is then optionally rinsed, acid cleaned, and subjected to a final rinse (see 206 in FIG. 3).

Next, the blade 20 (see FIGS. 1 and 2) is again mounted to receive the conforming wire anode 40 (see step 208 in the FIG. 3). An aluminum or aluminum alloy second layer is applied by electrodeposition onto the Cr or Ni—Cr first layer (see step 208 in the FIG. 3; see also layer 304 in FIG. 4).

The electrolyte solution of the deposition of aluminum or the aluminum alloy generally comprises non-aqueous aluminum electrolytes such as chloroaluminate ionic liquids. The second layer 304 (see FIG. 4) comprises aluminum or aluminum alloys and has a thickness of 5 to 200 micrometers, preferably 25 to 75 micrometers after the deposition.

Following the deposition of the second layer 304, the blade may be optionally rinsed to remove traces of surface impurities and unused electrolyte (See step 210 in FIG. 3.). The blade with the first layer 302 and the second layer 304 is then subjected to a heat treatment at a temperature of 800 to 1600° C., preferably 1000 to 1500° C. for period of 2 to 18 hours, preferably 4 to 8 hours (See step 212 in FIG. 3.). The heat treatment may occur in the presence of an inert atmosphere such as argon, nitrogen, carbon dioxide, or the like, or a combination thereof.

The heat treatment purifies and densifies the coatings 302 and 304 by a high temperature reaction to form a thermally grown oxide (TGO) layer 308 that comprises alumina ($Al_2O_3$) and chromium oxide ($Cr_2O_3$) atop a purified Ni—Cr/aluminide or Cr/aluminide layer 306 (see FIG. 4). Other methods of growing alumina ($Al_2O_3$) and chromium oxide ($Cr_2O_3$) atop the purified Ni—Cr/aluminide or Cr/aluminide layer 306 are detailed in U.S. Patent having Ser. No. 15/604,950 to Opalka et al., filed on May 25, 2017, the entire contents of which are hereby incorporated by reference.

The thermally grown oxide layer 308 has a thickness of 0.5 to 25 micrometers, preferably 2 to 7 micrometers. The Ni—Cr/aluminide layer of the Cr/aluminide layer 306 has a thickness of 5 to 200 micrometers, preferably 50 to 100 micrometers.

This heat treatment reduces impurities present in the Ni—Cr deposits to induce a reaction at a high temperature that uses aluminum as the scavenger. This leads to the formation of a diffused protective alumina on the surfaces of the internal passages of the airfoil. This treatment also facilitates densifying of the Ni—Cr or Cr first layer which prevents the outward diffusion of substrate elements during service.

In an embodiment, the heat treatment results in the diffusion of aluminum from the second layer 304 into the first layer 302 that contains either chromium or nickel-chromium (See FIG. 4). This diffusion results in the formation of the purified Ni—Cr/aluminide layer or a Cr/aluminide layer 306 (see FIG. 4). The purified Ni—Cr/aluminide layer of the Cr/aluminide layer 306 in the FIG. 4 has a gradient of aluminum and chromium that varies inversely with one another. The aluminum decreases in amount as the distance from the thermally grown oxide increases while the chromium increases in amount as the distance from the internal surface of the airfoil increases. The ratio of aluminum to chromium varies inversely as the distance from the thermally grown oxide increases, or alternatively, as the distance from the internal surface of the airfoil increases. This gradient may be a linear gradient, a curvilinear gradient or a step gradient.

The Ni—Cr/aluminide zone or the Cr/aluminide zone 306 (see FIG. 4) serves as a reservoir for both aluminum and chromium that replenishes the thermally grown oxide layer 308 that comprises alumina ($Al_2O_3$) and chromium oxide ($Cr_2O_3$). As the thermally grown oxide layer 308 gets depleted with usage, aluminum and chromium from the Ni—Cr/aluminide zone 306 or the Cr/aluminide zone 306 diffuses towards the thermally grown oxide layer 308 to form additional alumina and chromium oxide, thus preventing damage to the internal surface of the airfoil. This increases the life cycle of the component and also of the engine.

The electrodeposition process is advantageous in that it is low cost and is performed with elements and processes that are chemically benign.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil comprising:
    an internal surface having disposed thereon:
        a thermally grown oxide layer that comprises alumina and chromium oxide; and
        a layer comprising Ni—Cr/aluminide or Cr/aluminide disposed between the layer comprising alumina and chromium oxide and the internal surface of the airfoil; where the layer comprising Ni—Cr/aluminide or Cr/aluminide contains aluminum and chromium that vary in amount inversely with one another with distance from the internal surface of the airfoil or from a surface of the thermally grown oxide layer.

2. The airfoil of claim 1, where the thermally grown oxide layer has a thickness of 2 to 7 micrometers.

3. The airfoil of claim 1, where the layer comprising Ni—Cr/aluminide or Cr/aluminide has a thickness of 50 to 100 micrometers.

4. The airfoil of claim 1, where the layer comprising Ni—Cr/aluminide or Cr/aluminide is obtained by thermally treating:
    a first layer comprising chromium or nickel-chromium that is disposed on the internal surface of the airfoil; and
    a second layer that contains aluminum or an aluminum alloy that is disposed on the first layer.

5. The airfoil of claim 1, where the first layer and the second layer are deposited electrolytically.

6. The airfoil of claim 1, prepared by a method comprising:
    providing the airfoil to be coated; wherein the internal surface comprises a convoluted internal passage;
    electrolytically applying a first layer that comprises chromium or a chromium alloy onto the inner surface;
    electrolytically applying a second layer comprising aluminum or an aluminum alloy onto the first layer; and
    heat treating the airfoil to promote interdiffusion between the first layer and the second layer to form the thermally grown oxide layer that comprises alumina and chromium oxide; and the layer comprising Ni—Cr/aluminide or Cr/aluminide disposed between the layer comprising alumina and chromium oxide and the internal surface of the airfoil.

7. The airfoil of claim 6, wherein the electrolytically applying of the first layer and/or the electrolytically applying of the second layer is conducted via electrodeposition.

8. The airfoil of claim 6, where the electrodeposition is conducted by using a conforming electrode that traverses the convoluted internal passage of the component without contacting a surface of the airfoil.

9. The airfoil of claim 8, where the conforming electrode is an anode and where the article is a cathode.

10. The airfoil of claim 9, where the conforming electrode is coated with a porous electrically insulating material.

11. The airfoil of claim 6, where the electrolytically applying of the first layer comprises using an electrolyte that comprises a suspension of chromium or nickel-chromium.

12. The airfoil of claim 6, where the electrolytically applying of the second layer comprises using an electrolyte that comprises a suspension of aluminum or an aluminum alloy.

13. The airfoil of claim 6, where the first layer has a thickness of 50 to 100 micrometers.

14. The airfoil of claim 6, where the second layer has a thickness of 25 to 75 micrometers.

15. The airfoil of claim 6, where the heat treating is conducted at a temperature of 800 to 1600° C.

* * * * *